United States Patent
Hein et al.

(10) Patent No.: US 11,193,014 B2
(45) Date of Patent: Dec. 7, 2021

(54) ANTI-DRIP COMPOSITIONS INCLUDING TRANSPARENT BLENDS OF PMMA AND PC-SILOXANE COPOLYMER

(71) Applicant: SHPP GLOBAL TECHNOLOGIES B.V., Bergen op Zoom (NL)

(72) Inventors: Christopher Luke Hein, Mt. Vernon, IN (US); Hao Zhou, Mt. Vernon, IN (US); Bing Zhou, Mt. Vernon, IN (US); Manojkumar Chellamuthu, Mt. Vernon, IN (US); Peter Vollenberg, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 17/286,597

(22) PCT Filed: Oct. 22, 2019

(86) PCT No.: PCT/IB2019/059027
§ 371 (c)(1),
(2) Date: Jul. 13, 2021

(87) PCT Pub. No.: WO2020/084495
PCT Pub. Date: Apr. 30, 2020

(65) Prior Publication Data
US 2021/0309847 A1    Oct. 7, 2021

Related U.S. Application Data

(60) Provisional application No. 62/748,843, filed on Oct. 22, 2018.

(51) Int. Cl.
*C08L 33/12* (2006.01)
*C08L 69/00* (2006.01)
(Continued)

(52) U.S. Cl.
CPC .............. *C08L 33/12* (2013.01); *B29B 9/10* (2013.01); *B29B 13/02* (2013.01);
(Continued)

(58) Field of Classification Search
CPC .......... C08L 33/12; C08L 69/00; C08L 83/10; C08G 77/448
See application file for complete search history.

(56) References Cited

U.S. PATENT DOCUMENTS

| | | | |
|---|---|---|---|
| 4,478,981 | A | 10/1984 | Arkles |
| 4,743,654 | A | 5/1988 | Kyu et al. |

(Continued)

FOREIGN PATENT DOCUMENTS

| | | |
|---|---|---|
| WO | 2008042500 A1 | 4/2008 |
| WO | 2010076680 A1 | 7/2010 |

(Continued)

OTHER PUBLICATIONS

International Search Report and Written Opinion dated Dec. 6, 2019 in PCT/IB2019/059027 (13 pgs.).

(Continued)

*Primary Examiner* — Vu A Nguyen
(74) *Attorney, Agent, or Firm* — Quicker Law, LLC

(57) ABSTRACT

Thermoplastic compositions include: (a) from about 30 wt % to about 95 wt % poly(methyl methacrylate) (PMMA); and (b) from about 5 wt % to about 70 wt % of a poly(carbonate-siloxane) copolymer having a siloxane content of from about 25 wt % to about 45 wt %. Methods for making a molded article, include: (a) combining from about 30 wt % to about 95 wt % PMMA and from about 5 wt % to about 70 wt % of a poly(carbonate-siloxane) copolymer having a siloxane content of from about 25 wt % to about 45 wt % to (Continued)

100% PMMA
Flaming drips after 30s

80% PMMA/20% PC-Si (40% Si content)
Flaming drips after 40s form a blend; (b) melt processing and pelletizing the blend; and (c) injection molding the article from the melt processed and pelletized blend.

14 Claims, 2 Drawing Sheets

(51) Int. Cl.
    *C08L 83/10*       (2006.01)
    *B29B 9/10*        (2006.01)
    *C08G 77/448*    (2006.01)
    *B29B 13/02*     (2006.01)
    *B29C 45/00*     (2006.01)
    *B29K 33/00*     (2006.01)
    *B29K 83/00*     (2006.01)

(52) U.S. Cl.
    CPC .......... *B29C 45/0001* (2013.01); *C08L 83/10* (2013.01); *B29K 2033/12* (2013.01); *B29K 2083/00* (2013.01); *C08G 77/448* (2013.01); *C08G 2120/00* (2013.01); *C08L 2201/10* (2013.01); *C08L 2203/16* (2013.01)

(56) References Cited

U.S. PATENT DOCUMENTS

| | | | |
|---|---|---|---|
| 4,745,029 A | 5/1988 | Kambour | |
| 5,280,070 A | 1/1994 | Drzewinski | |
| 2008/0029744 A1* | 2/2008 | Jansen | C08L 55/02 252/601 |
| 2008/0033108 A1* | 2/2008 | Kung | C08L 55/02 525/67 |
| 2011/0281995 A1* | 11/2011 | Ha | C08L 33/08 524/506 |
| 2013/0261234 A1* | 10/2013 | Ma | C08L 69/00 524/126 |
| 2013/0345347 A1* | 12/2013 | Steendam | C08L 69/00 524/151 |
| 2018/0030259 A1 | 2/2018 | Somasundaram et al. | |
| 2018/0112035 A1 | 4/2018 | Rizo et al. | |
| 2018/0230305 A1* | 8/2018 | Okamoto | C08L 69/00 |

FOREIGN PATENT DOCUMENTS

| | | |
|---|---|---|
| WO | 2013/190474 A1 | 12/2013 |
| WO | 2016174592 A1 | 11/2016 |

OTHER PUBLICATIONS

Dixit M., et al., "Morphology, Miscibility and Mechanical Properties of PMMA/PC blends," In Phase Transitions, 2009, vol. 82, Issue 12, pp. 866-878. [https://doi.org/10.1080/01411590903478304]. (Abstract Only).

Kyu T., et al., "Immiscibility Loop Phase Behavior of Polycarbonate and Poly (methyl methacrylate) Blends," Journal of Polymer Science Part C: Polymer Letters, Oct. 1989, vol. 27, Issue 11, pp. 421-426. (Abstract Only).

Singh A.K. et al., "Specific Interactions in Partially Miscible Polycarbonate (PC)/poly (methyl methacrylate) (PMMA) Blends," Chemical Physics Letters, Feb. 2010, vol. 486, Issue 1-3, pp. 32-36. (Abstract Only).

* cited by examiner

ANTI-DRIP COMPOSITIONS INCLUDING TRANSPARENT BLENDS OF PMMA AND PC-SILOXANE COPOLYMER

CROSS-REFERENCE TO RELATED APPLICATION

This application is the National Stage of International Application No. PCT/IB2019/059027 filed Oct. 22, 2019, which claims the benefit of U.S. Provisional Application No. 62/748,843 filed Oct. 22, 2018, the disclosures of which are incorporated herein by this reference in their entireties.

FIELD OF THE DISCLOSURE

The present disclosure relates to thermoplastic compositions including poly(methyl methacrylate) and polycarbonate-siloxane copolymers, and in particular such compositions that have good anti-drip and transparency properties.

BACKGROUND OF THE DISCLOSURE

Blends of poly(methyl methacrylate) (PMMA) and polycarbonate (PC) are the focus of many investigations. Attempts have been made to develop a melt processable, transparent PMMA-PC blend having an increased glass transition temperature (Tg), but have been largely unsuccessful. Such blends generally have high haze, or are opaque and immiscible. PMMA is an amorphous polymer having excellent optical properties, chemical resistance, and high tensile strength, but it is also brittle, has low elongation at break and has high water absorption. Blends of PMMA with PC would be expected to have improved flexibility which could be useful in electronic display applications. Unfortunately, PMMA is also highly combustible. Burning PMMA results in flaming drips, which provide a secondary fire resource that can ignite other materials and lead to flame propagation.

These and other shortcomings are addressed by aspects of the disclosure.

SUMMARY

Aspects of the disclosure relate to thermoplastic compositions including: (a) from about 30 wt % to about 95 wt % poly(methyl methacrylate) (PMMA); and (b) from about 5 wt % to about 70 wt % of a poly(carbonate-siloxane) copolymer having a siloxane content of from about 25 wt % to about 45 wt %.

Further aspects of the disclosure relate to methods for making a molded article, the method including: (a) combining from about 30 wt % to about 95 wt % PMMA and from about 5 wt % to about 70 wt % of a poly(carbonate-siloxane) copolymer having a siloxane content of from about 25 wt % to about 45 wt % to form a blend; (b) melt processing and pelletizing the blend; and (c) injection molding the article from the melt processed and pelletized blend.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

DETAILED DESCRIPTION

Figure 1C:
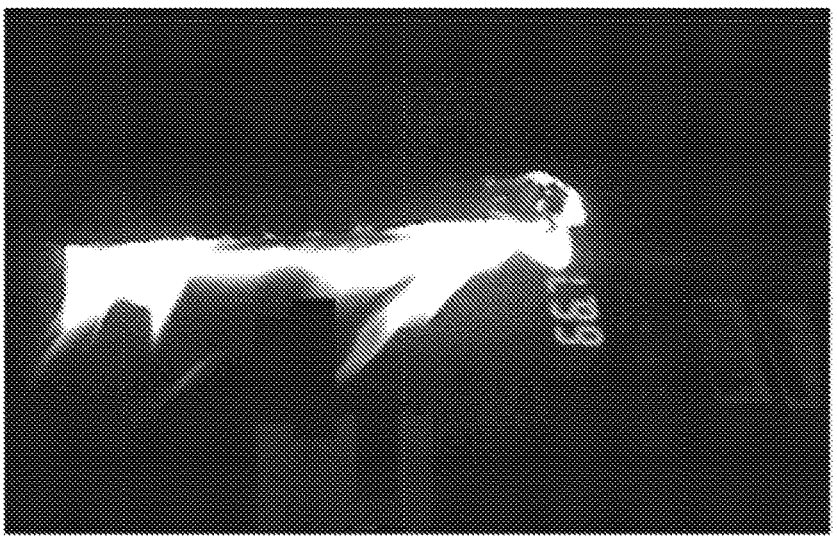
FIGS. 1A-1C are photographs showing flaming drip performance of (A) PMMA, (B) an 80/20 blend of PMMA/PC-Si (40% Si content in the PC-Si copolymer) and (C) a 60/40 blend of PMMA/PC-Si (40% Si content in the PC-Si copolymer).

The present disclosure relates to transparent blends of PMMA and PC-siloxane copolymers that include a relatively high siloxane content (about 25-45 wt % siloxane in the copolymer). Thermoplastic compositions including the PC-Si copolymer may be blended with PMMA to produce transparent blends across a wide range of polymer ratios. The blends have a glass transition temperature (Tg) greater than PMMA and can be melt processed at lower temperatures (240 degrees Celsius (° C.) or lower) than many conventional polycarbonate grades. In one aspect, the PMMA/PC-Si blend has a single Tg which demonstrates uniformly distributed phases. In addition to transparency, blends according to aspects of the disclosure are flexible, in contrast to conventional general purpose PMMA, which is brittle, and when blended with conventional PC is opaque or possesses high haze.

PMMA and PMMA/polycarbonate blends are highly flammable. While not typically a concern when these compositions are used in injected-molded articles, it has been discovered that certain PMMA and PC-siloxane copolymer blends such as those described herein have inherent anti-drip properties.

Specific aspects of the disclosure relate to a thermoplastic composition including from about 30 wt % to about 95 wt % poly(methyl methacrylate) (PMMA); and from about 5 wt % to about 70 wt % of a poly(carbonate-siloxane) copolymer having a siloxane content of from about 25 wt % to about 45 wt %.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used herein "Si content" or "X % Si" refers to the siloxane content of the component (e.g., the PC-Si copolymer) or composition.

As used in the specification and the appended claims, the singular forms "a," "an" and "the" include plural referents unless the context clearly dictates otherwise. Thus, for example, reference to "a poly(methyl methacrylate)" includes compositions including two or more poly(methyl methacrylates).

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "%," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions Including PMMA and PC-Si Copolymer

Aspects of the disclosure relate to thermoplastic compositions including from about 30 wt % to about 95 wt % PMMA, and from about 5 wt % to about 70 wt % of a poly(carbonate-siloxane) copolymer having a siloxane content of from about 25 wt % to about 45 wt %.

In some aspects the thermoplastic composition includes from about 30 wt % to about 80 wt % PMMA and from about 20 wt % to about 70 wt % of the poly(carbonate-siloxane) copolymer having a siloxane content of from about 25 wt % to about 45 wt %.

In certain aspects the poly(carbonate-siloxane) copolymer has a siloxane content of from about 35 wt % to about 45 wt %, and in a specific aspect the poly(carbonate-siloxane) copolymer has a siloxane content of about 40 wt %.

Any suitable PMMA polymer may be used in the composition. Exemplary PMMA polymers include, but are not limited to, Acrylite® POQ66 available from Evonik, Plexiglas® V920A available from Arkema, and combinations thereof.

The poly(carbonate-siloxane) copolymers include carbonate units and siloxane units. Suitable carbonate units are shown in formula (1)

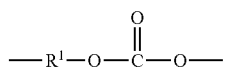
(1)

wherein at least 60 percent of the total number of IV groups is aromatic, or each IV contains at least one $C_{6-30}$ aromatic group. A combination of different IV groups can be present. The carbonate units can be derived from a dihydroxy compound such as an aromatic dihydroxy compound of formula (2) or a bisphenol of formula (3)

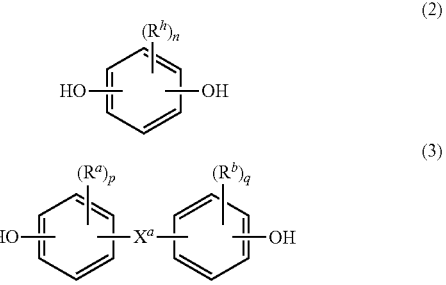

wherein in formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4; and in formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen.

In an aspect in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In still other aspects in formula (2), p and q is each 0, or p and q is each 1, and $R^a$ and $R^b$ are each a $C_{1-3}$ alkyl group, preferably methyl, disposed meta to the hydroxy group on each arylene group; $X^a$ is a bridging group connecting the two hydroxy-substituted aromatic groups, where the bridging group and the hydroxy substituent of each $C_6$ arylene group are disposed para to each other on the $C_6$ arylene group, and $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene; or a group of the formula —C(=$R^e$)— wherein $R^e$ is a divalent $C_{1-12}$ hydrocarbon group.

Examples of diphenols (2) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination comprising different diphenol compounds can be used.

Examples of bisphenols (3) include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 2,7-dihydroxycarbazole, or the like. A combination comprising different bisphenol compounds can be used.

Specific dihydroxy compounds include resorcinol, 2,2-bis (4-hydroxyphenyl) propane (bisphenol A or BPA), 3,3-bis (4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxyphenyl)-3,3,5-trimethylcyclohexane (TMC bisphenol).

In an aspect of formula (2), $R^a$ and $R^b$ are each independently $C_{1-6}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

In more preferred aspect, the bisphenol polycarbonate is a bisphenol A polycarbonate homopolymer, also referred to as bisphenol A homopolycarbonate, which has repeating structural carbonate units of formula (Ia).

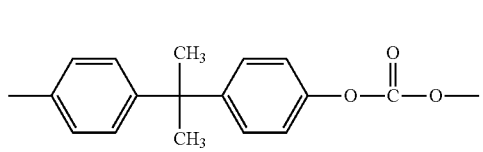

(Ia)

Such linear homopolymers containing bisphenol A carbonate units (BPA-PC) include those commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC.

The siloxane units (also referred to as polysiloxane blocks) are optionally of formula (4)

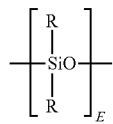

(4)

wherein each R is independently a $C_{1-13}$ monovalent organic group. For example, R can be a $C_{1-13}$ alkyl, C—$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an aspect, where a transparent poly(carbonate-siloxane) is desired, R is unsubstituted by halogen. A combination of the foregoing R groups can be used in the same poly(carbonate-siloxane).

In an aspect, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another aspect, each R is independently methyl, trifluoromethyl, or phenyl.

The value of E in formula (4) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane)s can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an aspect, the siloxane units are of formula (5)

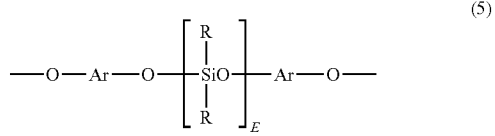

(5)

wherein E is as defined for formula (4); each R can be the same or different, and is as defined for formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (2) or formula (3). Exemplary dihydroxy compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (5) include those of the formulas (6a) and (6b)

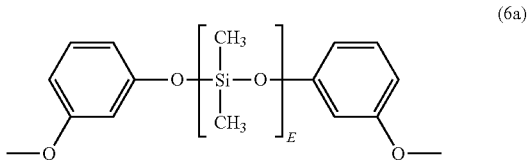

(6a)

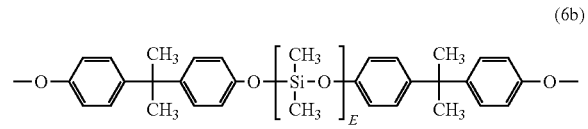

(6b)

wherein E is as described in Formula (4). In an aspect, E has an average value of 10 to 80 or 10 to 40, and in still another aspect, E has an average value of 40 to 80, or 40 to 70.

In another aspect, the siloxane units are of formula (7)

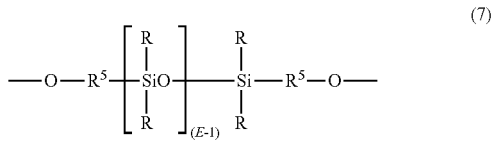

wherein R and E are as described for formula (4), and each $R^5$ is independently a divalent $C_{1-30}$ hydrocarbylene group, and wherein the polymerized polysiloxane unit is the reaction residue of its corresponding dihydroxy compound. In a specific aspect, the polydiorganosiloxane blocks are of formula (8):

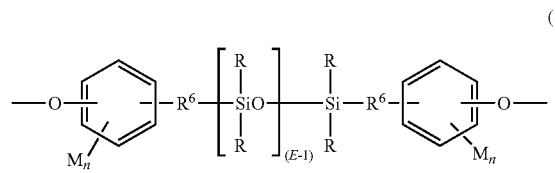

wherein R and E are as defined for formula (5). $R^6$ in formula (8) is a divalent $C_{2-8}$ aliphatic group. Each M in formula (8) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylarylenoxy, wherein each n is independently 0, 1, 2, 3, or 4.

In an aspect in formula (8), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another aspect in formula (8), R is methyl, or a combination of methyl and trifluoropropyl, or a combination of methyl and phenyl. In still another aspect in formula (8), R is methyl, M is methoxy, n is one, and $R^6$ is a divalent $C_{1-3}$ aliphatic group. Preferred polydiorganosiloxane blocks are of the formulas

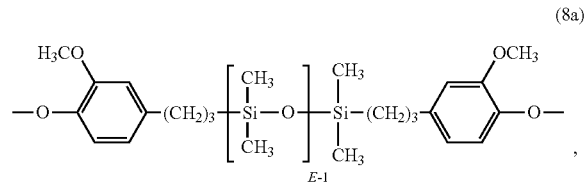

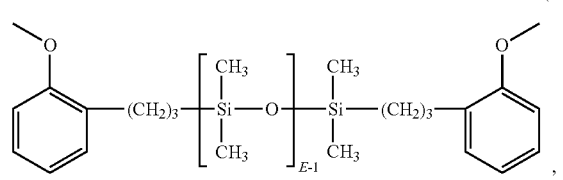

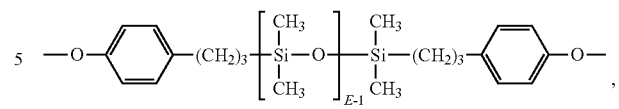

or a combination thereof, wherein E has an average value of 10 to 100, preferably 20 to 60, more preferably 30 to 50, or 40 to 50.

In an aspect, the poly(carbonate-siloxane) comprises carbonate units derived from bisphenol A, and repeating siloxane units (8a), (8b), (8c), or a combination thereof (preferably of formula 7a), wherein E has an average value of E has an average value of 10 to 100, or 20 to 60, or 30 to 60, or 40 to 60. In an aspect, the poly(carbonate-siloxane)s comprise carbonate units derived from bisphenol A and repeating siloxane units of formula (8a) (8b), or (8c), wherein E has an average value of 10 to 100, or 20 to 60, or 30 to 50, or 40 to 50.

The poly(carbonate-siloxane) can have a siloxane content of 25 to 45 wt %, or about 40 wt %, based on the total weight of the poly(carbonate-siloxane). As used herein, "siloxane content" of the poly(carbonate-siloxane) means the content of siloxane units based on the total weight of the poly(siloxane-carbonate). The poly(carbonate-siloxane) can have a weight average molecular weight of 26,000 to 45,000 Da, or 30,000 to 43,000 Da, or 35,000 to 40,000 Da as measured by gel permeation chromatography using a cross-linked styrene-divinyl benzene column, at a sample concentration of 1 milligram per milliliter, and as calibrated with bisphenol A polycarbonate standards. In other aspects, the poly(carbonate-siloxane) can have a weight average molecular weight of 10,000 to 100,000 Da, or 50,000 to 100,000 Da.

The poly(carbonate-siloxane) copolymer can be transparent and can be combined with various colorants including colored flakes and the like to give objects with fluorescent, phosphorescent, reflective, and sparkle appearance. Pigments and dyes that change color at different temperatures may also be used in combination with the copolymer.

In some aspects the thermoplastic composition including the PMMA and the poly(carbonate-siloxane) copolymer is transparent. As used herein, "transparent" means that the composition has a total light transmission (specular+diffuse) of at least 60% when measured on a sample of the composition having a thickness of from 1.0 to 3.2 millimeters (mm). In further aspects the composition including the PMMA and the poly(carbonate-siloxane) copolymer is translucent. As used herein, "translucent" means that the composition has a total light transmission (specular+diffuse) of greater than 30% but less than 60% when measured on a sample of the composition having a thickness of from 1.0 to 3.2 mm. It is noted that light transmission is not significantly affected by part thickness in this thickness range. In certain aspects the composition has a total light transmission, or transmission, of at least 70%, or at least 75%, or at least 80%, or at least 85%, or at least 90%, when measured on a sample of the composition having a thickness of from 1.0 to 3.2 millimeters (mm). In particular aspects the composition has a transparency of at least 80% when measured on a sample of the composition having a thickness of 2.2 mm or 1.2 mm. Transparency may be measured in accordance with ASTM D1003.

The thermoplastic composition may be flexible in some aspects. As used herein, "flexible" means that the composition has a tensile elongation at break of 20% or higher.

In certain aspects the composition further includes one or more additional polymers. Suitable additional polymers include, but are not limited to, low density polyethylene, poly(ethylene-propylene), styrene-butadiene rubber, polybutadiene, poly(butyl acrylate), silicone rubber, polyamide, polyaramide, polycarbonate, polyester, polyimide, polyetherimide, polystyrene, polyurethane, blends thereof, copolymers thereof, and combinations thereof.

In some aspects the composition further includes one or more additional additives. Suitable additional additives include, but are not limited to, fillers, pigments, whitening agents, optical brighteners, surfactants, processing aids, thermal stabilizers, photochemical stabilizers, and combinations thereof.

The thermoplastic composition including the PMMA and the poly(carbonate-siloxane) copolymer may in some aspects have a notched Izod impact strength as measured in accordance with ASTM D256 at 23° C. that is higher than that of a substantially identical reference composition that does not include the poly(carbonate-siloxane) copolymer. In particular aspects the thermoplastic composition has a notched Izod impact strength as measured in accordance with ASTM D256 at 23° C. that is at least about 100% higher, or at least about 150% higher, or at least about 200% higher, or at least about 250% higher, or at least about 300% higher, or at least about 350% higher, than that of a substantially identical reference composition that does not include the poly(carbonate-siloxane) copolymer.

As used herein, a "substantially identical reference composition" is a composition that includes the same components, and the same amounts of the components, as the example composition, except that the reference composition does not include the recited component (e.g., the poly(carbonate-siloxane) copolymer is omitted). Where one component is removed, the wt % of the removed component is added to the primary polymer in the composition. Thus, if an example composition includes 59 wt % PMMA, 39 wt % poly(carbonate-siloxane) copolymer and 2 wt % other components, a substantially identical reference composition that does not include the poly(carbonate-siloxane) copolymer includes 98 wt % PMMA and 2 wt % of the same other components as the example composition.

In certain aspects the thermoplastic composition has a flexural modulus as measured in accordance with ASTM D790 at 23° C. that is lower than that of a substantially identical reference composition that does not include the poly(carbonate-siloxane) copolymer. In certain aspects the thermoplastic composition has a flexural modulus as measured in accordance with ASTM D790 at 23° C. that at least about 10% lower, or at least about 20% lower, or at least about 30% lower, or at least about 40% lower, than that of a substantially identical reference composition that does not include the poly(carbonate-siloxane) copolymer.

The thermoplastic composition may in some aspects have a nano-dispersed poly(carbonate-siloxane) copolymer phase in the PMMA and a single glass transition temperature (Tg).

In further aspects the thermoplastic composition is hydrothermally stable. As used herein, hydrothermally stable means that the composition, after 1000 hours of aging in 60° C. and 95% relative humidity (RH) conditions, has a reduction in transmittance (% T) of less than about 5%, or in aspects a reduction in % T of less than about 2%, or in particular aspects a reduction in % T of less than about 1%. Hydrothermally stable may also, or in the alternative, mean that the composition, after 1000 hours of aging in 60° C. and 95% relative humidity (RH) conditions, has an increase in haze of less than about 30%, or less than about 25%, or less than about 20%, or less than about 15% or less than about 10%. Transmittance and haze may be determined in accordance with ASTM D1003.

In certain aspects the thermoplastic composition has a transmittance, as tested in accordance with ASTM D1003, that is at least about 5% greater than that of a substantially identical reference thermoplastic composition that includes a poly(carbonate-siloxane) copolymer having a siloxane content of 50 wt %. In further aspects the thermoplastic composition has a transmittance, as tested in accordance with ASTM D1003, that is at least about 10% greater, or from about 5% to about 20% greater, than that of a substantially identical reference thermoplastic composition that includes a poly(carbonate-siloxane) copolymer having a siloxane content of 50 wt %

In some aspects the thermoplastic composition has a haze, as tested in accordance with ASTM D1003, that is at least about 10% lower than that of a substantially identical reference thermoplastic composition that includes a poly(carbonate-siloxane) copolymer having a siloxane content of 50 wt %. In particular aspects the thermoplastic composition has a haze, as tested in accordance with ASTM D1003, that is at least about 12% lower, or at least about 10 wt % to about 60 wt % lower, or at least about 35 wt % to about 60 wt % lower, a than that of a substantially identical reference thermoplastic composition that includes a poly(carbonate-siloxane) copolymer having a siloxane content of 50 wt %.

In further aspects the composition has an overall siloxane content sufficient to prevent flaming drips when a sample of the composition is exposed to a vertical flame. The vertical flame test may be performed by according to the process described in the Examples. In certain aspects the overall siloxane content of the composition is greater than 8 wt %. In further aspects the overall siloxane content of the composition is greater than 9 wt %, or greater than 10 wt %, or greater than 15 wt %, or from about 8 wt % to about 35 wt %, or from about 10 wt % to about 35 wt %, or from about 15 wt % to about 35 wt %.

Methods of Making the Thermoplastic Compositions

Aspects of the disclosure further relate to methods of making a thermoplastic composition, including: (a) combining from about 30 wt % to about 95 wt % PMMA and from about 5 wt % to about 70 wt % of a poly(carbonate-siloxane) copolymer having a siloxane content of from about 25 wt % to about 45 wt % to form a blend; (b) melt processing and pelletizing the blend; and (c) injection molding the article from the melt processed and pelletized blend. In certain aspects the poly(carbonate-siloxane) copolymer has a siloxane content of about 40 wt %. The PMMA, poly(carbonate-siloxane) copolymer and thermoplastic composition may include any of the components and have any of the properties described herein.

In particular aspects step (a) of the method is performed prior to polymerization of any of the PMMA and poly(carbonate-siloxane) copolymer. In other words, the PMMA and poly(carbonate-siloxane) copolymer are combined upfront in the reactor during polymerization. In certain aspects the melt processing step (i.e., step (b)) is performed at a temperature of about 240° C., or in some aspects less than about 240° C. The thermoplastic composition may in particular aspects have a nano-dispersed poly(carbonate-siloxane) copolymer phase in the PMMA and a single glass transition temperature (Tg).

Articles Including the Thermoplastic Composition

Aspects of the disclosure also relate to articles including the thermoplastic composition described herein. In some aspects the article is a film, a sheet, a molded article, a welded article, a filament or a powder. In particular aspects the article is a film for a consumer electronics device.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:

(a) from about 30 wt % to about 95 wt % poly(methyl methacrylate) (PMMA); and (b) from about 5 wt % to about 70 wt % of a poly(carbonate-siloxane) copolymer having a siloxane content of from about 25 wt % to about 45 wt %.

Aspect 2. The thermoplastic composition according to Aspect 1, wherein the poly(carbonate-siloxane) copolymer has a siloxane content of about 40 wt %.

Aspect 3. The thermoplastic composition according to Aspect 1 or 2, wherein composition has a nano-dispersed poly(carbonate-siloxane) copolymer phase in the PMMA.

Aspect 4. The thermoplastic composition according to any of Aspects 1 to 3, wherein the composition has a single glass transition temperature (Tg).

Aspect 5. The thermoplastic composition according to any of Aspects 1 to 4, wherein the composition comprises an overall siloxane content sufficient to prevent flaming drips when a sample of the composition is exposed to a vertical flame.

Aspect 6. The thermoplastic composition according to Aspect 5, wherein the overall siloxane content of the composition is greater than 8 wt %.

Aspect 7. The thermoplastic composition according to any of Aspects 1 to 6, wherein the composition further comprises one or more additional polymers.

Aspect 8. The thermoplastic composition according to Aspect 7, wherein the one or more additional polymers are selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof; copolymers thereof; and combinations thereof.

Aspect 9. The thermoplastic composition according to any of Aspects 1 to 8, wherein the composition further comprises one or more additional additives.

Aspect 10. The thermoplastic composition according to Aspect 9, wherein the one or more additional additives is selected from the group consisting of: a filler; a pigment; a whitening agent; an optical brightener; a surfactant; a processing aid; a thermal stabilizer; a photochemical stabilizer; and combinations thereof.

Aspect 11. The thermoplastic composition according to any of Aspects 1 to 10, wherein the composition has a notched Izod impact strength as measured in accordance with ASTM D256 at 23° C. that is higher than that of a substantially identical reference composition that does not include the poly(carbonate-siloxane) copolymer.

Aspect 12. The thermoplastic composition according to any of Aspects 1 to 11, wherein the composition has a flexural modulus as measured in accordance with ASTM D790 at 23° C. that is lower than that of a substantially identical reference composition that does not include the poly(carbonate-siloxane) copolymer.

Aspect 13. The thermoplastic composition according to any of Aspects 1 to 12, wherein the composition is transparent.

Aspect 14. The thermoplastic composition according to any of Aspects 1 to 13, wherein the thermoplastic composition comprises from about 30 wt % to about 80 wt % PMMA and from about 20 wt % to about 70 wt % of the poly(carbonate-siloxane) copolymer.

Aspect 15. The thermoplastic composition according to any of Aspects 1 to 14, wherein the composition comprises about 60 wt % PMMA and about 40 wt % poly(carbonate-siloxane) copolymer, and wherein the poly(carbonate-siloxane) copolymer has a siloxane content of about 40 wt %.

Aspect 16. A method for making a molded article, the method comprising, consisting of, or consisting essentially of:

(a) combining from about 30 wt % to about 95 wt % poly(methyl methacrylate) (PMMA) and from about 5 wt % to about 70 wt % of a poly(carbonate-siloxane) copolymer having a siloxane content of from about 25 wt % to about 45 wt % to form a blend;

(b) melt processing and pelletizing the blend; and (c) injection molding the article from the melt processed and pelletized blend.

Aspect 17. The method according to Aspect 16, wherein the poly(carbonate-siloxane) copolymer has a siloxane content of about 40 wt %.

Aspect 18. The method according to Aspect 16 or 17, wherein step (b) is performed at a temperature of 240 degrees Celsius (° C.) or lower.

Aspect 19. The method according to any of Aspects 16 to 18, wherein composition has a nano-dispersed poly(carbonate-siloxane) copolymer phase in the PMMA.

Aspect 20. The method according to any of Aspects 16 to 19, wherein the composition has a single glass transition temperature (Tg).

Aspect 21. The method according to any of Aspects 16 to 20, wherein the composition comprises an overall siloxane content sufficient to prevent flaming drips when a sample of the composition is exposed to a vertical flame.

Aspect 22. The method according to Aspect 21, wherein the overall siloxane content of the composition is greater than 8 wt %.

Aspect 23. The method according to any of Aspects 16 to 22, wherein the composition further comprises one or more additional polymers.

Aspect 24. The method according to Aspect 23, wherein the one or more additional polymers are selected from the group consisting of: low density polyethylene; poly(ethylene-propylene); styrene-butadiene rubber; polybutadiene; poly(butyl acrylate); silicone rubber; polyamide; polyaramide; polycarbonate; polyester; polyimide; polyetherimide; polystyrene; polyurethane; blends thereof; copolymers thereof; and combinations thereof.

Aspect 25. The method according to any of Aspects 16 to 24, wherein the composition further comprises one or more additional additives.

Aspect 26. The method according to Aspect 25, wherein the one or more additional additives is selected from the group consisting of: a filler; a pigment; a whitening agent; an optical brightener; a surfactant; a processing aid; a thermal stabilizer; a photochemical stabilizer; and combinations thereof.

Aspect 27. The method according to any of Aspects 16 to 26, wherein the composition has a notched Izod impact strength as measured in accordance with ASTM D256 at 23° C. that is higher than that of a substantially identical reference composition that does not include the poly(carbonate-siloxane) copolymer.

Aspect 28. The method according to any of Aspects 16 to 27, wherein the composition has a flexural modulus as measured in accordance with ASTM D790 at 23° C. that is lower than that of a substantially identical reference composition that does not include the poly(carbonate-siloxane) copolymer.

Aspect 29. The method according to any of Aspects 16 to 28, wherein the composition is transparent.

Aspect 30. The method according to any of Aspects 16 to 29, wherein the thermoplastic composition comprises from about 30 wt % to about 80 wt % PMMA and from about 20 wt % to about 70 wt % of the poly(carbonate-siloxane) copolymer.

Aspect 31. The method according to any of Aspects 16 to 30, wherein the composition comprises about 60 wt % PMMA and about 40 wt % poly(carbonate-siloxane) copolymer, and wherein the poly(carbonate-siloxane) copolymer has a siloxane content of about 40 wt %.

Aspect 32. The thermoplastic composition according to any of Aspects 1 to 15, wherein the composition has a transparency of at least 80% when measured in accordance with ASTM D1003 at a thickness of 1.2 millimeters (mm).

Aspect 33. The method according to any of Aspects 16 to 31, wherein the composition has a transparency of at least 80% when measured in accordance with ASTM D1003 at a thickness of 1.2 millimeters (mm).

Aspect 34. An article comprising the thermoplastic composition according to any of Aspects 1 to 33.

Aspect 35. The article according to Aspect 34, wherein the article comprises a film, a sheet, a molded article, a welded article, a filament or a powder.

Aspect 36. The article according to Aspect 34, wherein the article is a film for a consumer electronics device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Compositions described herein included materials set forth below in Table 1:

TABLE 1

| Materials | |
|---|---|
| Component | Source |
| PMMA - POQ66 | Evonik |
| PMMA Plexiglas ® V920A | Arkema |
| PC-Siloxane copolymer (40% siloxane content) | SABIC |
| PC-Siloxane copolymer (20% siloxane content) - C9030P | SABIC |
| PC-Siloxane copolymer (6.5% siloxane content) - C9030T | SABIC |
| PC-Siloxane copolymer (60% siloxane content) | SABIC |
| PC-Siloxane copolymer (50% siloxane content) | SABIC |
| Optical quality PC (OQPC) | SABIC |
| Lexan ™ 121R PC | SABIC |

Pellets of the composition were extruded according to one of the following:
Brabender Intelli-Torque Plasti-Corder® Torque Rheometer with conical twin screws (#404 and 403), 240 degrees Celsius (° C.), 3 kilogram (kg) blend size
DSM Xplore 15 cc micro extruder, 240° C., 40 gram (g) blend size The pellets were compression molded using a Carver press at 240° C. (the C9030T and C9030P blends were processed at 260° C.).

Dynamic Mechanical Analysis (DMA): the dynamic thermos-mechanical properties of the materials were measured with a DMA Q800 analyzer (TA instruments). The tension mode was used with a frequency of 1 hertz (Hz), at a strain level of 0.01%, in a temperature range from −120° C. to 200° C. The heating rate was 3° C./min. The testing was performed by using rectangular bars having a thickness of from about 0.5 millimeter (mm) to 1.0 mm.

Parallel Plate Oscillatory Rheology: Melt Rheology. The dynamic oscillatory frequency sweeps were run using an ARES strain-controlled rheometer. The frequency sweep method is used to determine the viscosity or modulus of a material as a function of frequency at a constant temperature (240° C.). The measurements were performed using 25 mm parallel-plate geometry at a 3% strain with a fixed gap of 1 mm. The frequency was varied from 0.1 radian per second (rad/s) to 500 rad/s.

Example Compositions

As shown in FIGS. 2A, 2B, transparent blends of PMMA and PC-Si copolymer (40% Si content) were produced across a wide resin ratio range:

TABLE 2A

| Varying Amounts of PMMA/PC-Si Copolymer | | | | | | | |
|---|---|---|---|---|---|---|---|
| Formulation | C2.1 | Ex 2.1 | Ex 2.2 | Ex 2.3 | Ex 2.4 | Ex 2.5 | Ex 2.6 |
| PMMA | 100 | 95 | 90 | 80 | 80 | 70 | 60 |
| PC-Si (40% Si content) | | 5 | 10 | 20 | 20 | 30 | 40 |
| Conditions | | | | | | | |
| Physical form: pellet/powder | p | p/pwd | p/pwd | p/pwd | pwd/pwd | p/pwd | p/pwd |

TABLE 2A-continued

Varying Amounts of PMMA/PC-Si Copolymer

| Formulation | C2.1 | Ex 2.1 | Ex 2.2 | Ex 2.3 | Ex 2.4 | Ex 2.5 | Ex 2.6 |
|---|---|---|---|---|---|---|---|
| Extruder | Micro | Micro | Micro | Micro | Brabender | Micro | Micro |
| Melt Temp ° C. | 220 | 220 | 220 | 220 | 230 | 220 | 220 |
| Performance: | | | | | | | |
| Clear, Haze, High Haze, Opaque, Brittle, Flexible, Ductile, DeLaminated | C, B | C, B | C, B | C, H, F | C, H, F | C, H, F | C, H, F |

TABLE 2B

Varying Amounts of PMMA/PC-Si Copolymer

| Formulation | Ex 2.7 | Ex 2.8 | Ex 2.9 | Ex 2.10 | C 2.2 |
|---|---|---|---|---|---|
| PMMA | 60 | 50 | 40 | 30 | 20 |
| PC-Si (40% Si content) | 40 | 50 | 60 | 70 | 80 |
| Conditions | | | | | |
| Physical form: pellet/powder | pwd/pwd | pwd/pwd | pwd/pwd | p/pwd | p/pwd |
| Extruder | Brabender | Micro | Micro | Micro | Micro |
| Melt Temp ° C. | 230 | 220 | 220 | 220 | 220 |
| Performance | | | | | |
| Clear, Haze, High Haze, Opaque, Brittle, Flexible, Ductile, DeLaminated | C, H, F | C, H, F | C, H, F | C, H, F | HH, D, DL |

As noted, the blends having 20-70% PC-Si were flexible (Ex2.3-Ex2.10); they also had a flexural modulus lower than PMMA. Some haze was present in these blends, and haze increased visually with increasing levels of PC-Si. For example, the 30/70 PMMA/PC-Si blend (Ex2.10) had more haze visually than the 60/40 blend (Ex2.7). The 20/80 PMMA/PC-Si blend (C2.2) exhibited evidence of delamination in the extruded strand.

Comparative examples are shown in Table 3, including examples including a PC-Si copolymer having an Si content of 6.5%, 20% and 60%:

TABLE 3

Formulations Including Different Siloxane Types

| | Ex 3.1 | Ex 3.2 | C3.1 | C3.2 | C3.3 | C3.4 | C3.5 | C3.6 |
|---|---|---|---|---|---|---|---|---|
| PMMA | 60 | 80 | 100 | | 60 | 60 | 60 | |
| PC-Si (40% Si Content) | 40 | 20 | | | | | | 40 |
| Lexan ™ 121R PC | | | | 100 | | | | |
| PC-Si (6.5% Si Content) C9030T | | | | | 40 | | | |
| PC-Si (20% Si Content) C9030P | | | | | | 40 | | |
| PC-Si (60% Si Content) | | | | | | | 40 | |
| Optical Quality PC (OQPC) | | | | | | | | 60 |
| *Microextrusion* | | | | | | | | |
| Copolymer Siloxane wt % | 40 | 40 | N/A | N/A | 6.5 | 20 | 60 | 40 |
| Overall Siloxane Content wt % | 16 | 8 | N/A | N/A | 2.6 | 8 | 24 | 16 |
| % T 2.2 mm ASTM D1003 Compression molded plaque | 82.7 | 89.1 | 94.0 | 86.0 | 16.2 | 31.0 | 46.4 | 12.2 |
| Haze 2.2 mm Compression molded plaque | 33.0 | 12.0 | 4.0 | 10.5 | | | | |
| % T 1.2 mm ASTM D1003 Compression molded plaque | 87.1 | 91.7 | 94.0 | 89.2 | 32.5 | 48.5 | 56.8 | 25.2 |
| Haze 1.2 mm Compression molded plaque | 14.1 | 6.5 | 4.0 | 7.2 | | | | |
| Appearance: Transparent (T), Minor haze (H), Opaque (O) | T, H | T, H | T | T | O | O | O | O |

TABLE 3-continued

Formulations Including Different Siloxane Types

|  | Ex 3.1 | Ex 3.2 | C3.1 | C3.2 | C3.3 | C3.4 | C3.5 | C3.6 |
|---|---|---|---|---|---|---|---|---|
| | | | | Brabender Extrusion | | | | |
| Izod Impact-Notched ASTM D256 lbft/ft at 23° C. | 170 | 93 | 35 | 156 | — | — | — | — |
| Izod Impact-Unnotched ASTM D4812 lbft/ft at 23° C. | 986 | 585 | 220 | 720 | — | — | — | — |
| Flexural modulus ASTM D790 in MPa | 1930 | 2520 | 3220 | 2340 | — | — | — | — |
| Flexural Stress at break ASTM D790 in MPa | No Break | No Break | 86 | No Break | — | — | — | — |
| Tg DMA ° C. | 123 | 121 | 115 | | | | | |

Transparency in PMMA blends is confined to a narrow compositional range. For example, an opaque blend was produced when the siloxane copolymer (C9030T) included only 6.5 wt % siloxane in the copolymer (C3.3). Likewise, an opaque blend was produced when the copolymer siloxane content was increased to 20 wt % (C3.4). Transparent blends, however, were produced when the siloxane content in the copolymer was around 40 wt % (Ex3.1, Ex3.2). Once the copolymer siloxane content was increased to 60 wt %, however, the blend was again opaque.

PMMA/siloxane copolymer transparency is uniquely derived from the siloxane copolymer and is not achievable by simply blending a targeted level of siloxane from other siloxane copolymers known in the art. For instance, Ex3.2 and comparative example C3.4 each included the average siloxane level of 8 wt % after blending, while only the 80/20 PMMA/PC-Si (40% Si content) (Ex3.2) was transparent.

The PMMA/PC-Si (40% Si content) blends possessed high impact energy and low flexural modulus. The 60/40 PMMA/PC-Si (40% Si content) (Ex3.1) sample had an Izod impact energy that was greater than 100% Lexan 121R (C3.2) and substantially greater than 100% PMMA (C3.1). In addition, the blend had lower flexural modulus compared to both Lexan 121R and POQ66 PMMA (Table 3). It was noted that the Izod impact breaks for Ex.3.1 and Ex3.2 were brittle.

Given the lower modulus of PMMA/PC-Si (40% Si content) and low processing temperature, such blends are expected to be a good resin matrix for photochromic dyes. Other dyes such as 3-hydroxy flavone fluorophores would be expected to benefit from the lower processing temperature compared to polycarbonate.

Overall, the example compositions described above were flexible, while rapid impact (Izod) results in brittle breaks.

Figure 1B:
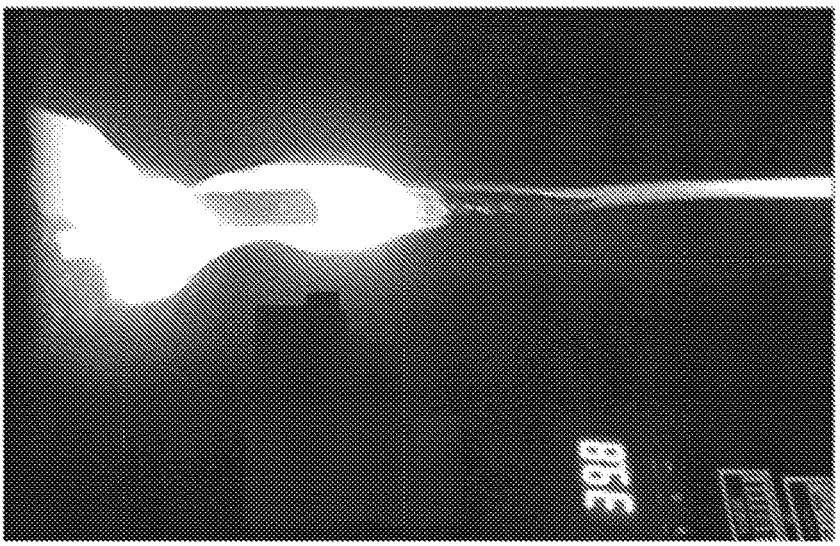
Figure 1A:
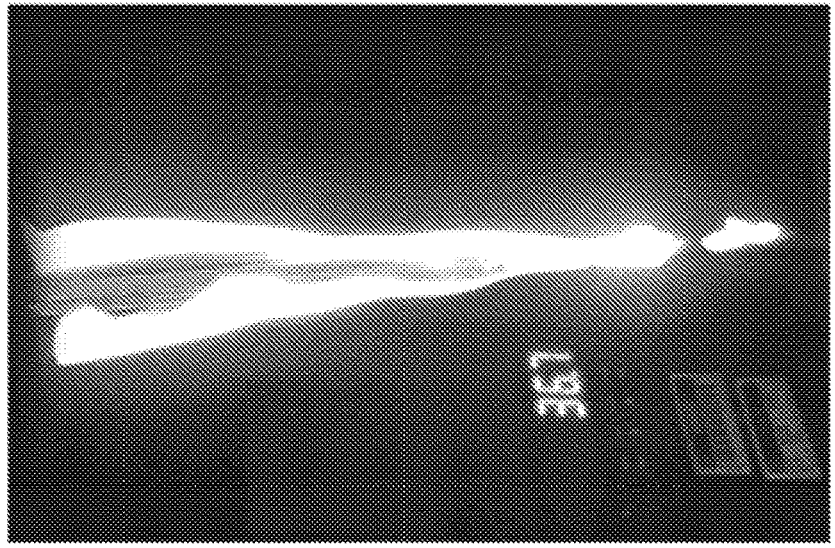
Figure 2:
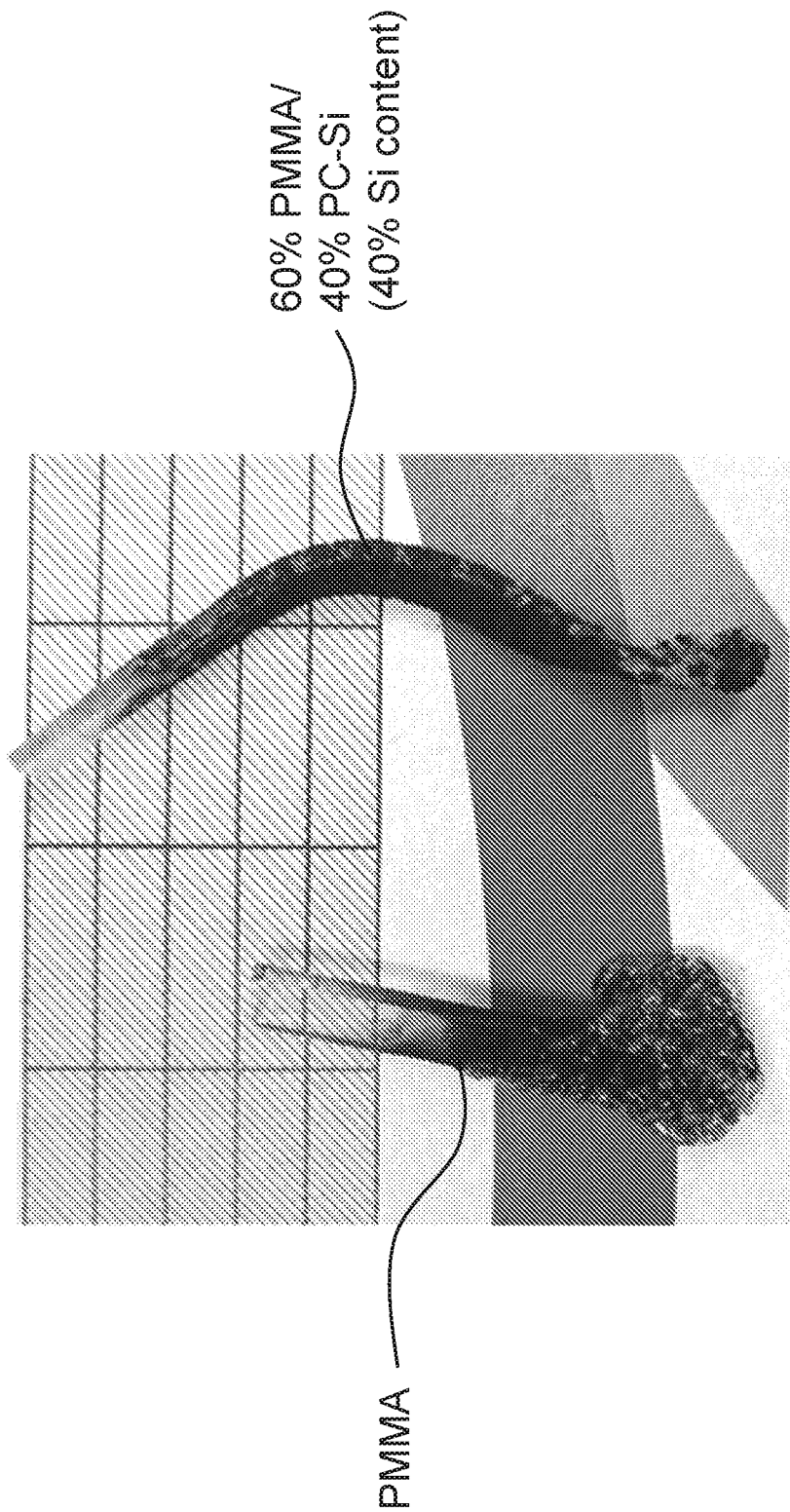
FIG. 2 is a photograph showing recovered samples of PMMA and a 60/40 blend of PMMA/PC-Si (40% Si content in the PC-Si copolymer) following a flaming drip test.

With reference to FIGS. 1A-1C and FIG. 2, samples of compositions described herein were also tested for flaming drip performance in accordance with the process described herein. The flaming drip test was performed as a vertical flame test, using a 0.125 inch HDT bar. The flame height was 20 mm, the flame power was 50 Watts and the flame had an inner cone height of 10 mm and an outer cone height of 10 mm. Gas pressure was <10 mm H$_2$O, flow was 105 milliliters per minute, and the flame was placed 10 mm from the sample. The timer was started when the flame contacted the sample. The vertical flaming drip test was applied to samples of PMMA (FIG. 1A), an 80/20 blend of PMMA/PC-Si (40% Si content) (FIG. 1B), and a 60/40 blend of PMMA/PC-Si (40% Si content) (FIG. 1C). As illustrated, the PMMA sample was rapidly consumed by the flame and began to drip after about 30 seconds (s) (FIG. 1A). The 80/20 blend of PMMA/PC-Si (40% Si content) was also highly combustible and resulted in flaming drips after about 40 seconds (FIG. 1B). The 60/40 blend of PMMA/PC-Si (40% Si content) included co-continuous copolymer and did not drip even after 60 seconds of flame application (FIG. 1C). Following the flaming drip test, the PMMA sample and the 60/40 PMMA/PC-Si (40% Si content) sample were recovered; a photograph of these samples is illustrated in FIG. 2.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:
   (a) from 30 wt % to 95 wt % poly(methyl methacrylate) (PMMA); and
   (b) from 5 wt % to 70 wt % of a poly(carbonate-siloxane) copolymer having a siloxane content of from 25 wt % to 45 wt %.

2. The thermoplastic composition according to claim 1, wherein the poly(carbonate-siloxane) copolymer has a siloxane content of 40 wt %.

3. The thermoplastic composition according to claim 1, wherein the composition has a nano-dispersed poly(carbonate-siloxane) copolymer phase in the PMMA.

4. The thermoplastic composition according to claim 1, wherein the composition has a transparency of at least 80% when measured in accordance with ASTM D1003 at a thickness of 1.2 millimeters (mm).

5. The thermoplastic composition according to claim 1, wherein the overall siloxane content of the composition is greater than 8 wt %.

6. The thermoplastic composition according to claim 1, wherein the composition further comprises one or more additional additives, wherein the one or more additional additives is selected from the group consisting of: a filler; a pigment; a whitening agent; an optical brightener; a surfactant; a processing aid; a thermal stabilizer; a photochemical stabilizer; and combinations thereof.

7. The thermoplastic composition according to claim 1, wherein the composition has a notched Izod impact strength as measured in accordance with ASTM D256 at 23° C. that is higher than that of a substantially identical reference composition that does not include the poly(carbonate-siloxane) copolymer.

8. The thermoplastic composition according to claim 1, wherein the composition has a flexural modulus as measured in accordance with ASTM D790 at 23° C. that is lower than that of a substantially identical reference composition that does not include the poly(carbonate-siloxane) copolymer.

9. An article comprising the thermoplastic composition according to claim 1.

10. The article according to claim 9, wherein the article comprises a film, a sheet, a molded article, a welded article, a filament or a powder.

11. The article according to claim 9, wherein the article is a film for a consumer electronics device.

12. A method for making a molded article, the method comprising
   (a) combining from 30 wt % to 95 wt % poly(methyl methacrylate) (PMMA) and from 5 wt % to 70 wt % of a poly(carbonate-siloxane) copolymer having a siloxane content of from 25 wt % to 45 wt % to form a blend;
   (b) melt processing and pelletizing the blend; and
   (c) injection molding the article from the melt processed and pelletized blend.

13. The method according to claim 12, wherein the poly(carbonate-siloxane) copolymer has a siloxane content of 40 wt %.

14. The method according to claim 12, wherein step (b) is performed at a temperature of 240 degrees Celsius (° C.) or lower.

* * * * *